US007139144B1

(12) United States Patent
Hartman et al.

(10) Patent No.: US 7,139,144 B1
(45) Date of Patent: Nov. 21, 2006

(54) METHOD AND APPARATUS FOR WRITING SPIRAL SERVO INFORMATION BY MODIFYING EXISTING SERVO TRACK WRITING EQUIPMENT

(75) Inventors: Allen P. Hartman, Thornton, CO (US); Ed Browning, Niwot, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/923,570

(22) Filed: Aug. 6, 2001

Related U.S. Application Data

(60) Provisional application No. 60/223,446, filed on Aug. 4, 2000.

(51) Int. Cl.
*G11B 21/02* (2006.01)

(52) U.S. Cl. .......................................... 360/51; 360/75
(58) Field of Classification Search ................. 360/51, 360/77.02
See application file for complete search history.

(56) References Cited

U.S. PATENT DOCUMENTS

| | | | |
|---|---|---|---|
| 4,157,577 A | 6/1979 | Porter, Jr. et al. ............. 360/77 |
| 4,587,579 A | 5/1986 | Cocke et al. .................. 360/75 |
| 5,003,412 A | 3/1991 | Bizjak et al. ............. 360/77.01 |
| 5,119,248 A | 6/1992 | Bizjak et al. .................. 360/75 |
| 5,164,863 A | 11/1992 | Janz ............................. 360/57 |
| 5,519,546 A | 5/1996 | Lewis .......................... 360/48 |
| 5,583,712 A * | 12/1996 | Brunelle .................. 360/77.07 |
| 5,668,679 A | 9/1997 | Swearingen et al. .......... 360/75 |
| 5,793,559 A | 8/1998 | Shepherd et al. ........ 360/78.09 |
| 6,084,738 A * | 7/2000 | Duffy ........................... 360/75 |
| 6,091,564 A | 7/2000 | Codilian et al. .............. 360/75 |
| 6,144,517 A * | 11/2000 | Watanabe et al. ........ 360/77.04 |
| 6,388,833 B1 * | 5/2002 | Golowka et al. ........ 360/77.02 |
| 6,476,995 B1 * | 11/2002 | Liu et al. ...................... 360/75 |
| 6,507,450 B1 * | 1/2003 | Elliott ..................... 360/77.08 |
| 6,587,293 B1 * | 7/2003 | Ding et al. ................... 360/51 |
| 6,674,593 B1 * | 1/2004 | Jolly et al. .................... 360/51 |
| 6,714,376 B1 | 3/2004 | Brunnett et al. .............. 360/75 |
| 6,937,420 B1 | 8/2005 | McNab et al. ................ 360/75 |
| 6,943,978 B1 | 9/2005 | Lee ............................. 360/75 |

* cited by examiner

*Primary Examiner*—Andrea Wellington
*Assistant Examiner*—Varsha A. Kapadia
(74) *Attorney, Agent, or Firm*—Tejpal S. Hansra

(57) ABSTRACT

A method and apparatus for writing spiral servo information is provided. In one embodiment, a servo track writer having a digital signal processor is provided. The servo track writer also includes a clock head, which reads a clock track from a disk surface to generate a clock signal that is used to provide interrupt signals to the digital signal processor. A transducer, which writes spiral servo information onto the disk surface, is positioned under control of the digital signal processor based upon the interrupt signals. In one embodiment, a method of writing spiral servo information onto a disk surface using a servo track writer having a digital signal processor is provided. The method includes the steps of reading a clock track written onto the disk surface to generate interrupt signals; providing the interrupt signals to the digital signal processor; and, positioning a transducer over the disk surface under control of the digital signal processor based upon the interrupt signals provided thereto.

47 Claims, 8 Drawing Sheets

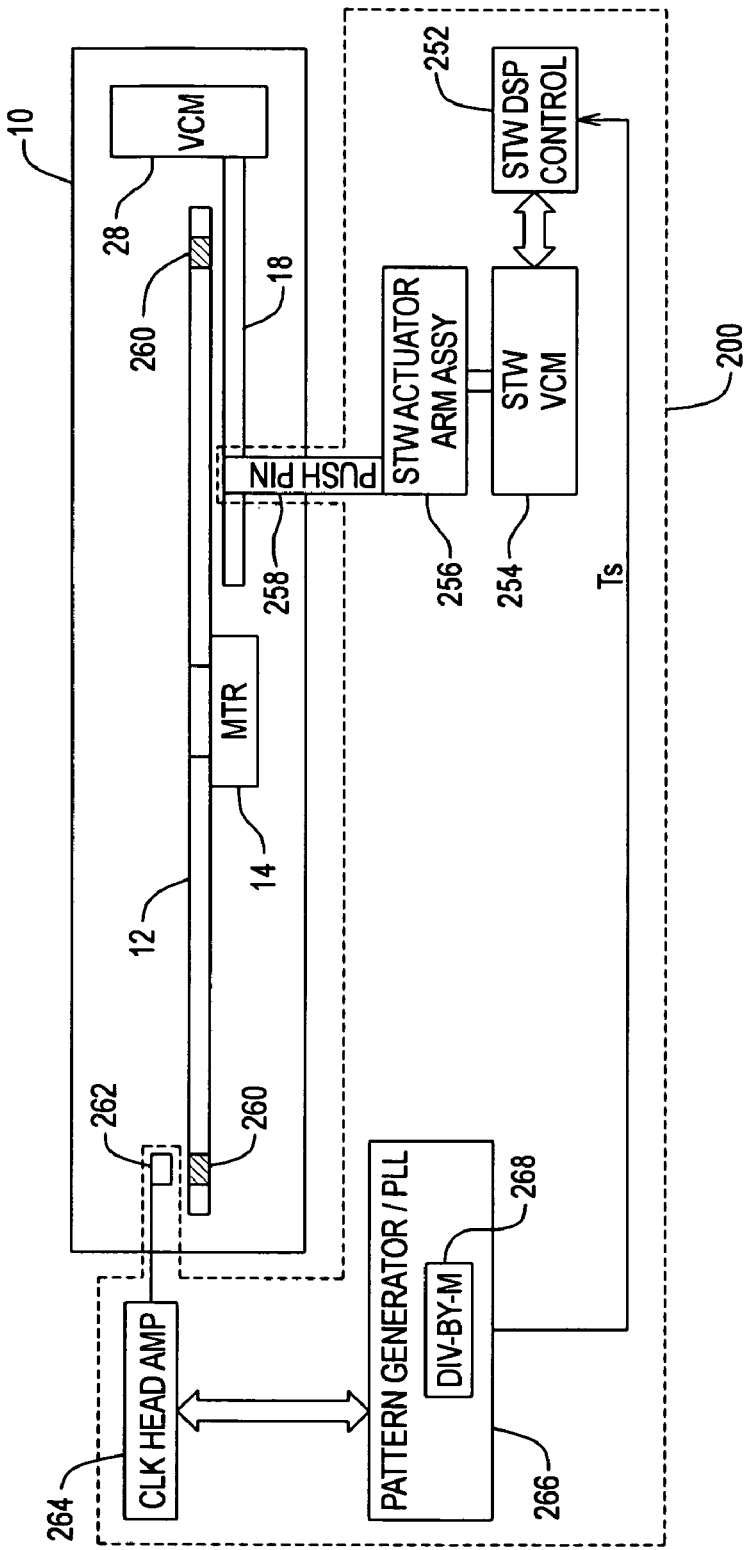

FIG. 10

$$\left(\frac{X\text{ rev}}{\min}\right)\left(\frac{\min}{60\text{ sec}}\right)\left(\frac{Y\text{ sec}}{\text{int}}\right) = \left(\frac{\text{Rev}}{Z\text{ int}}\right) \quad :\text{[EQUATION 1]}$$

EXAMPLE 1: FOR $Z = \dfrac{160\text{ int}}{\text{Rev}}$ $$Y = \frac{68\text{ u sec}}{\text{int}}$$

$$\Rightarrow X = \frac{60\text{ sec}}{\min} \quad \frac{\text{int}}{68\text{ u sec}} \quad \frac{\text{Rev}}{160\text{ int}} = 5514.705\text{ RPM}$$

EXAMPLE 2: FOR $X = 5700$ RPM $$Z = \frac{160\text{ int}}{\text{Rev}}$$

$$\Rightarrow Y = \frac{60\text{ sec}}{\min} \quad \frac{\min}{5700\text{ Rev}} \quad \frac{\text{Rev}}{160\text{ int}} = \frac{65.789\text{ u sec}}{\text{int}}$$

FIG. 11

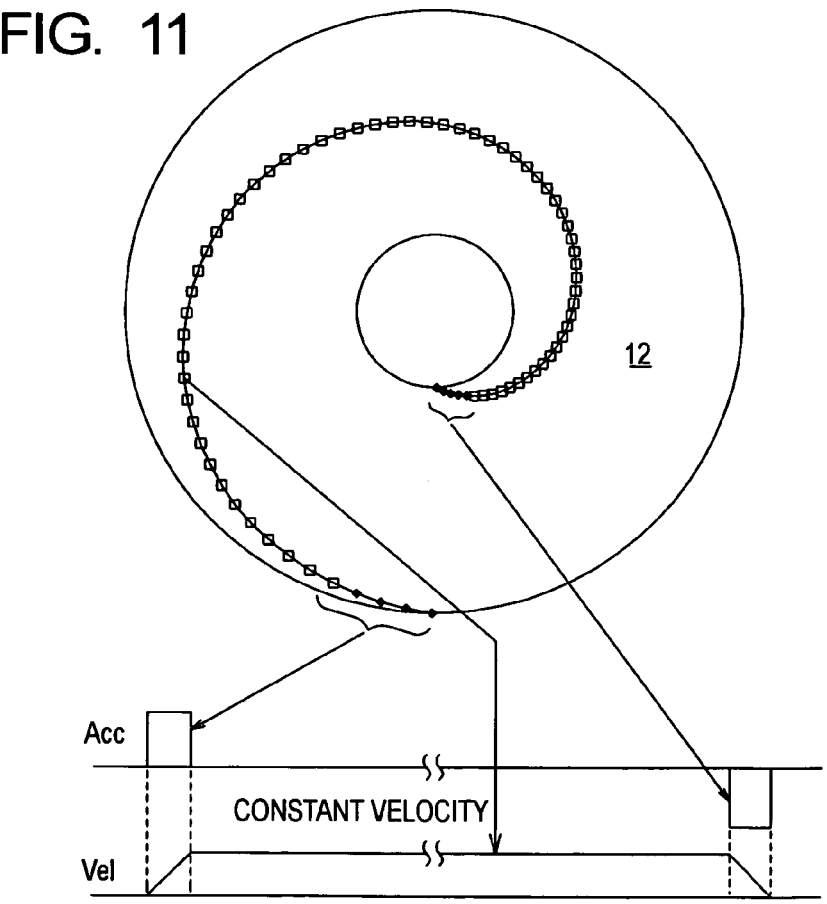

METHOD AND APPARATUS FOR WRITING SPIRAL SERVO INFORMATION BY MODIFYING EXISTING SERVO TRACK WRITING EQUIPMENT

CROSS-REFERENCE TO RELATED APPLICATION

Priority is claimed from U.S. Provisional Patent Application Ser. No. 60/223,446 filed Aug. 4, 2000, which is incorporated by reference herein in its entirety.

INCORPORATION BY REFERENCE

U.S. patent application Ser. No. 09/853,093 filed May 9, 2001 is also incorporated herein by reference in its entirety.

FIELD OF THE INVENTION

The present invention relates to computer disk drives. More particularly, the present invention relates to writing servo information onto one or more disk surfaces of a disk drive, wherein the servo information is written in a spiral fashion by modifying existing servo track writing equipment.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16.

The disk drive 10 also includes an actuator arm assembly 18, which includes a transducer 20 (wherein the transducer has both a write head and a read head) mounted to a flexure arm 22. The actuator arm assembly 18 is attached to an actuator arm 24 that can rotate about a bearing assembly 26. A voice coil motor 28 cooperates with the actuator arm 24 and, hence, the actuator arm assembly 18, to move the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 32 via an input/output port 34. The disk drive 10 is used by the host computer 32 as a data storage device. The host 32 delivers data access requests to the disk drive 10 via port 34. In addition, port 34 is used to transfer customer data between the disk drive 10 and the host 32 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 (i.e., the read head) above a desired track of the disk 12 and sensing the magnetic polarity transitions stored within the track, as the track moves below the transducer 20. Similarly, data is "written" to the disk 12 by positioning the transducer 20 (i.e., the write head) above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ in response to, among other things, an access command received from the host computer 32 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 32 into a write current signal that is delivered to the transducer 20 to "write" the customer data to an appropriate portion of the disk 12. The read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 that each cross all of the tracks 42 on the disk 12. The servo information in the servo spokes 44 is read by the transducer 20 during disk drive operation for use in positioning the transducer 20 above a desired track 42 of the disk 12. The portions of the track between servo spokes 44 have traditionally been used to store customer data received from, for example, the host computer 32 and are thus referred to herein as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of writing servo information on the disk surface with a high degree of positional accuracy. In general, a STW is a very expensive piece of capital equipment. Thus, it is generally desirable that a STW be used as efficiently as possible during manufacturing operations. Even a small reduction in the amount of data needed to be written by the STW per disk surface can result in a significant cost and time savings.

FIG. 4 depicts, in block diagram form, certain portions of a conventional servo track writer 50 and a disk drive 10. Only those components that are used to position the disk drive's actuator arm assembly 18 radially relative to the center of the disk surface are shown in FIG. 4. Among other things, the servo track writer 50 includes an STW digital signal processor (DSP) 52, a STW voice-coil motor (VCM) 54, a STW actuator arm assembly 56 and a push-pin system 58.

In order to write servo information on to a disk surface 12, the disk drive 10 is loaded onto the STW 50 and is held securely in place. One of a variety of push-pin systems 58 (e.g., a mechanical push-pin system or an optical push-pin system) is used to create an interface between the actuator arm assembly 18 of disk drive 10 and the actuator arm assembly 56 of the servo track writer 50. By properly positioning the STW actuator arm assembly 56, the actuator arm assembly 18 and, hence, the transducer 20 of the disk drive 10 may be positioned at an appropriate location relative to the center of the disk surface 12. In order to effectuate this positioning, the STW 50 uses a servo loop formed by an external relative encoder (see block 70 in FIG. 6), which cooperates with (or forms a part of) the STW VCM 54, and a compensation circuit (see block 70 in FIG. 6).

Once the transducer 20 is appropriately positioned relative to the disk surface 12, servo information is then written by the transducer 20 onto the disk surface 12 at the particular radial location. Subsequently, the STW actuator arm assembly 56 is used to position the actuator arm assembly 18 of the disk drive 10 at a next radial location and servo information is written at this radial location. The process repeats until servo information is written at all predetermined radial locations across the disk surface 12.

As shown in FIG. 4, the STW 50 also includes a crystal 60 and a divide-by-N circuit which are used to provide a series of interrupt signals 64 (see FIG. 5) to the STW DSP 52 at predetermined sample times, $T_s$. Upon receipt of an interrupt signal 64, the STW DSP 52 performs an interrupt service routine (ISR) 66, which lasts for a duration generally less than the sample time, $T_s$, as indicated by the brackets shown in FIG. 5.

FIG. 6 depicts, in block diagram form, the steps of a conventional interrupt service routine. As shown in FIG. 6, the ISR broadly includes the steps of: profile generation (block 68), STW servo loop closure, whereby the generated profile is followed (block 70), and communication/housekeeping between the host computer 32 and the STW DSP 52 (block 72).

Although not shown in FIG. 4, the STW 50 also includes an external clock head assembly and a phase-locked loop (PLL). The external clock head is used for reading a clock track that has been written on the disk surface 12 using conventional techniques (e.g., the Monte Carlo technique). The phase-locked loop (PLL) is provided to maintain very accurate physical transitions relative to the disk surface 12. Importantly, in the conventional STW 50, the transducers 20 of the disk drive 10 are "placed" and "held" at radial positions relative to the center of the disk 12 completely independently from the clock PLL. It is only after the transducers have been "placed" at a radial position that the transducers 20 write the appropriate servo pattern clocked out by the PLL clock via a pattern generator, which keeps track of the circumferential position. After the servo pattern has been written, the transducers 20 are moved to the next radial position (again, independent from the clock PLL) and the process is repeated. Eventually, servo information is written across the entire disk surface to form the servo spokes 44 shown in FIG. 3.

Because servo information is currently written by placing transducers at radial locations across the disk surface and then writing servo information which is used to define a track, the time for writing servo information increases as the total number of tracks able to be placed on a disk surface increases. Since the number of tracks per inch (TPI) continues to increase, manufacturing times are likely to continue to increase, unless more servo track writers are supplied. However, as alluded to above, the purchase of additional servo track writers involves a significant capital expense.

In order to solve this problem and to expedite the manner by which servo information is written onto a disk surface (among other things), it has been determined that it would be beneficial to write servo information in spiral patterns (see, U.S. patent application Ser. No. 09/853,093 filed May 9, 2001, which is incorporated herein by reference in its entirety). FIG. 7 is a simplified diagrammatic representation of first and second spiral patterns 100, 102 written onto a disk surface 12. Each of the spiral patterns 100, 102 is written while the transducer 20 is dynamically moved across the disk surface 12 at a constant velocity. The spiral patterns 100, 102 may include a constant frequency pattern with synch marks (represented by black squares in FIG. 7) imbedded therein. During operation of the disk drive 10, the synch marks are used to position a transducer 20 over the disk surface 12 and, hence, forms (at least a part of) the servo information.

Writing servo information in such a manner presents a number of new problems. For example, since the transducer 20 is not "placed" and "held" at a particular radius relative to the center of the disk surface 12 before servo information is written, it would be desirable to develop a method for ensuring that corresponding synch marks along different spirals are located along the same radius. Furthermore, it would be desirable to develop a method for ensuring that the circumferential distance between adjacent synch marks along the same radius is equivalent. Reference is made to FIG. 8, which is diagrammatic representation of a fragmentary top view of a disk surface 12 having two spiral patterns written thereon, to illustrate these points.

As shown in FIG. 8, portions of Spiral N and Spiral N+1 are written on disk surface 12. A first synch mark 104 associated with Spiral N is written along Spiral N near the outer diameter of the disk surface 12. Similarly, a first synch mark 106 associated with Spiral N+1 is written along Spiral N+1 near the outer diameter of the disk surface 12. For the servo information to properly perform its function, sync mark X of Spiral N and synch mark X of Spiral N+1 should lie on the same radius R relative to the center 108 of the disk 12. Furthermore, the circumferential distance between adjacent synch marks along the same radius should be the same. For example, the circumferential distance between adjacent synch marks that lie along radius R should be equal to the circumferential distance D between synch mark X of Spiral N and synch mark X of Spiral N+1.

A further problem is that, as mentioned above, servo track writers are extremely expensive instruments. Accordingly, replacing existing servo track writers with new servo track writers that are used to write servo information in spiral patterns would be extremely expensive. Thus, it would be beneficial to develop a method for writing servo information using spiral patterns by minimally modifying existing servo track writers, rather than requiring altogether new servo track writers.

SUMMARY OF THE INVENTION

The present invention is designed to reduce the aforementioned problems and meet the aforementioned, and other, needs.

Instead of the servo loop of the STW acting independently and asynchronously with regard to the disk surface and the clock track, in the present invention, the clock PLL is divided down to produce the required sample time as an external interrupt to the servo track writer's digital signal processor. Accordingly, a sample-time/servo-sector interrupt, which is tied to the physical disk surface, is created. Since each interrupt occurs at a known disk location (i.e., the next servo sector), a position profile can be specified at each interrupt that will guarantee that spirals (and, hence, synch marks) will be placed at exact positions on the disk and relative to each other.

Preferably, servo track writing is performed in a closed-loop fashion for all profile movements. In such case, the position of the actuator (and, hence, the transducer) relative to the disk surface is known at all times (e.g., both during movements or stationary periods). This command side processing is as exact as the underlying clock PLL jitter and/or STW DSP interrupt service routine processing repeatability.

Other embodiments, objects, features and advantages of the invention will be apparent from the following specification taken in conjunction with the following drawings.

BRIEF DESCRIPTION OF THE DRAWINGS

FIG. 9 is a simplified diagrammatic representation of a modified servo track writer for writing spiral servo information in accordance with the present invention;

FIG. 10 illustrates an equation showing the relationship between spindle speed X (in units of revolutions per minute), the interrupt rate Y (in units of seconds per interrupt) and the number of interrupts per revolution Z (in units of interrupts per revolution), along with two illustrative example calculations;

FIG. 11 is a diagrammatic representation illustrating acceleration and velocity curves along a disk surface for one embodiment of a "write portion" of a spiral profile;

DETAILED DESCRIPTION OF THE PREFERRED EMBODIMENT

Figure 1:
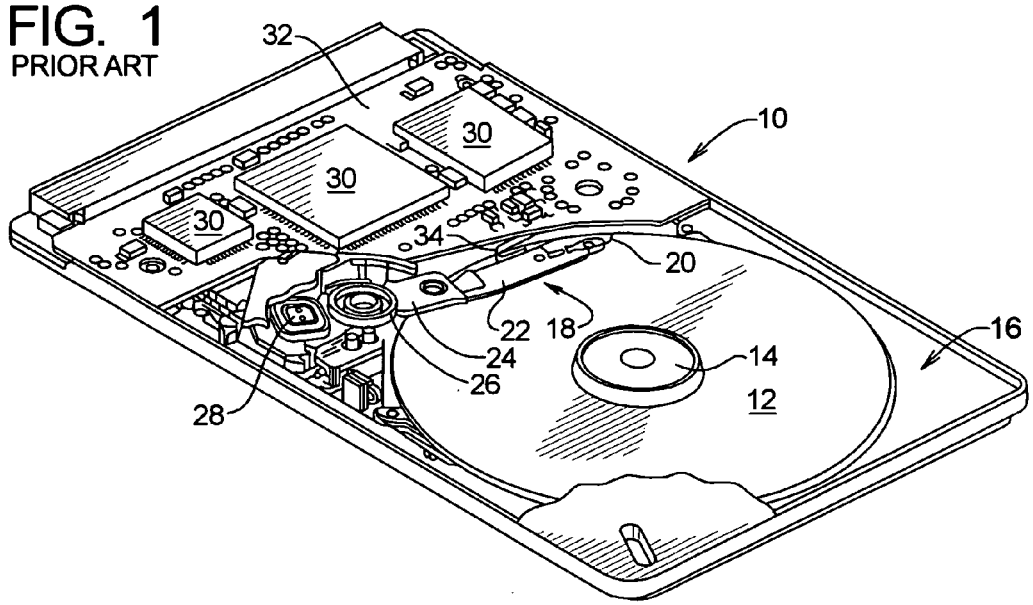
FIG. 1 is a diagrammatic representation illustrating a conventional disk drive with its top cover removed.
Figure 2:
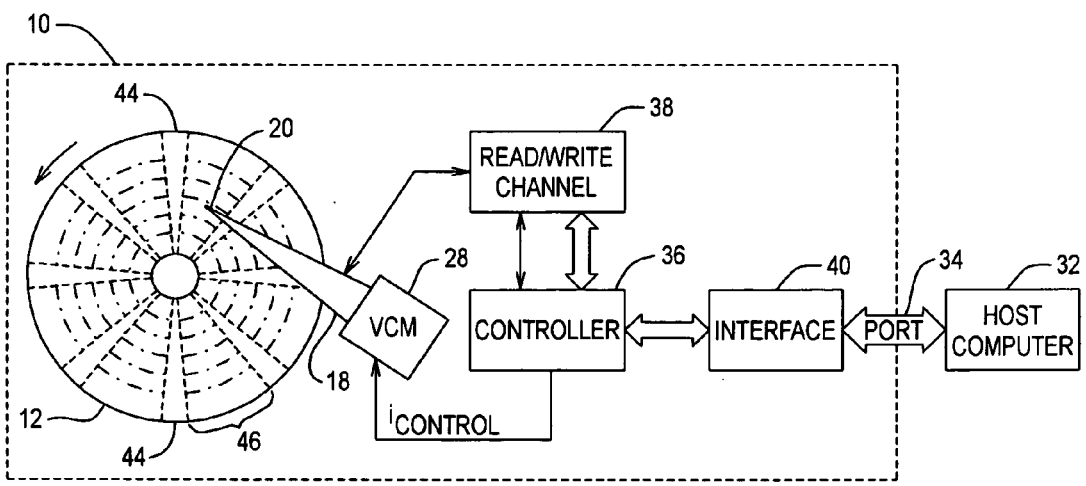
FIG. 2 is a functional block diagram which illustrates a conventional disk drive that is coupled to a host computer via an input/output port.
Figure 3:
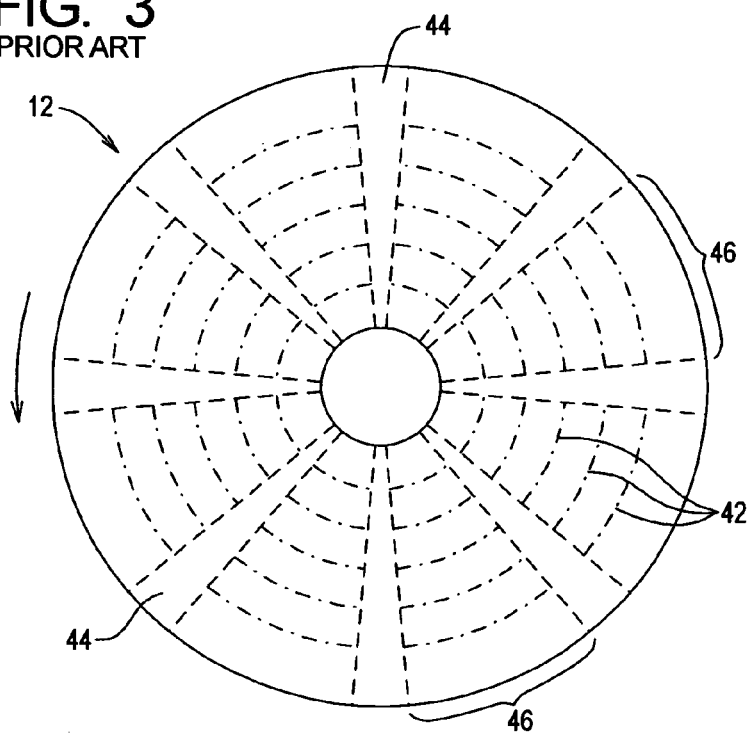
FIG. 3 is a diagrammatic representation of a top view of a magnetic storage disk illustrating a typical organization of data on the surface of a disk.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 4:
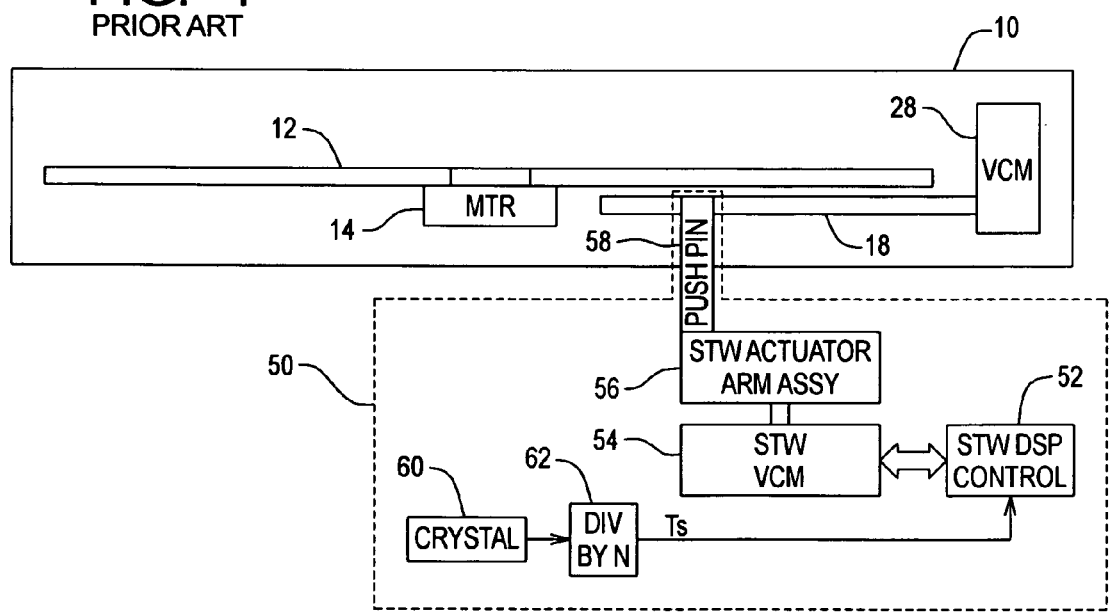
FIG. 4 is a block diagram illustrating portions of a conventional servo track writer.
Figure 5:
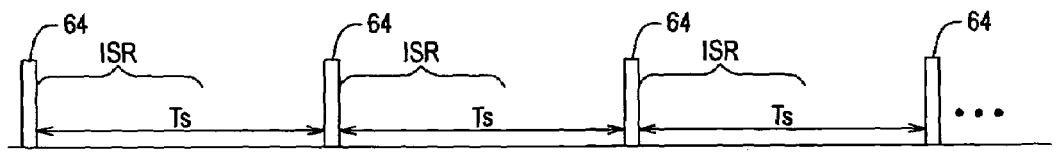
FIG. 5 is a diagrammatic representation illustrating a series of interrupt signals which occur at predetermined sample times, $T_s$.
Figure 6:
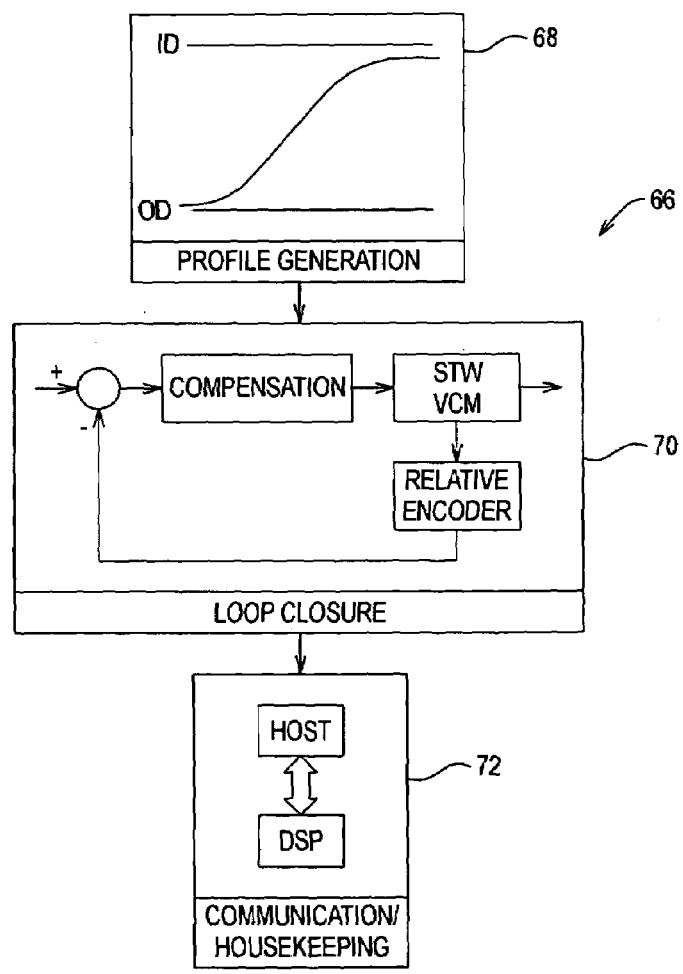
FIG. 6 is a block diagram illustrating a conventional interrupt service routine.
Figure 7:
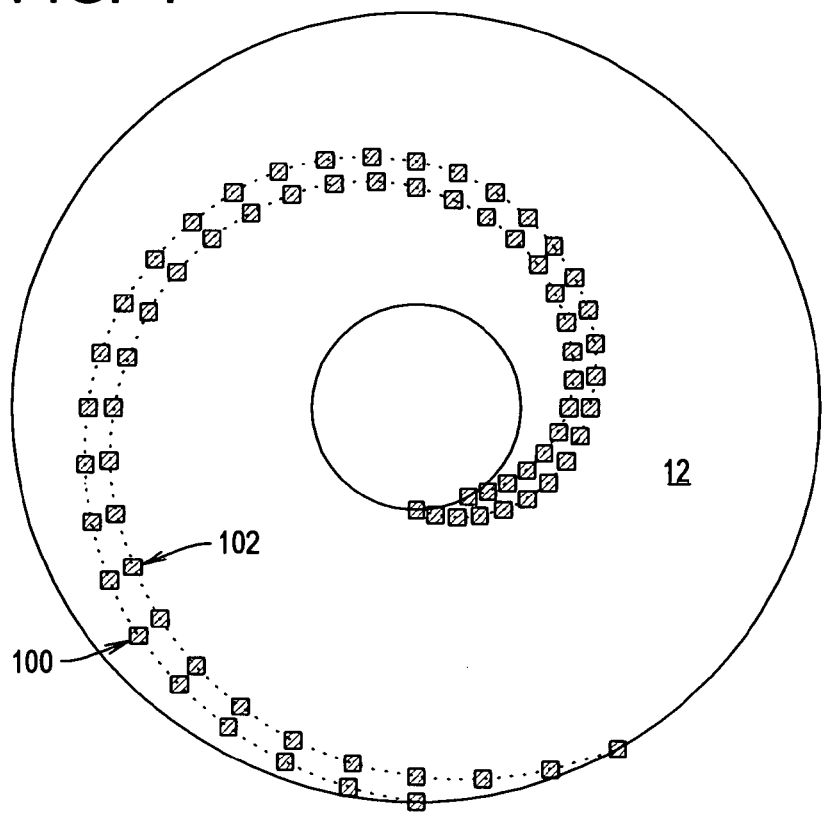
FIG. 7 is a simplified diagrammatic representation of first and second spiral patterns written onto a disk surface.
Figure 8:
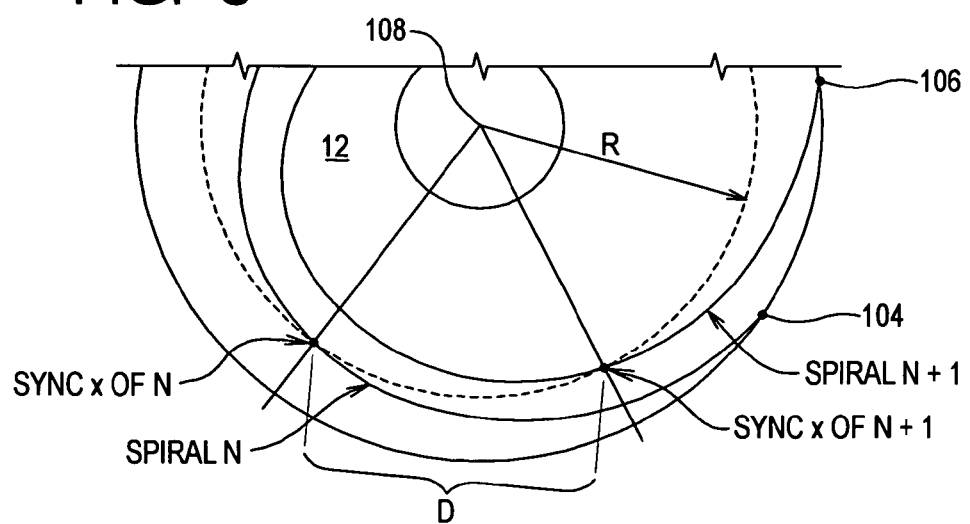
FIG. 8 is simplified diagrammatic representation of a fragmentary top view of a disk surface having two spiral patterns written thereon.

FIG. 9 is a diagrammatic representation of a modified servo track writer 200 for writing spiral servo information in accordance with the present invention. Like the conventional STW shown in FIG. 4, the modified servo track writer 200 includes a STW digital signal processor (DSP) 252, a STW voice-coil motor (VCM) 254, a STW actuator arm assembly 256 and a push-pin system 258. However, in contrast to the conventional STW 50 shown in FIG. 4, the modified STW 200 of the present invention uses signals read from a clock track 260 written on the disk surface 12 to provide a series of interrupt signals to the STW DSP 252.

More specifically, a clock head 262 is used to read information stored in the clock track 260 and generates an analog clock signal that is delivered to clock head amplifier 264. An amplified analog clock signal is then delivered to a pattern generator/PLL 266 to generate a digital clock signal. The pattern generator/PLL 266 preferably also includes a divide-by-M circuit 268, which is used to divide down the digital clock signal, to provide a series of interrupt signals to the STW DSP 254 at sample times, $T_s$, that are "tied" to the disk surface 12.

As shown in FIG. 10, the spindle speed X (in units of revolutions per minute), the interrupt rate Y (in units of seconds per interrupt) and the number of interrupts per revolution Z (in units of interrupts per revolution) are related to one another, as set forth in Equation 1. Thus, by setting any two of the parameters X, Y or Z, one can solve for the unknown parameter.

In one embodiment, the number of interrupts per revolution Z is equal to the number of servo samples per revolution (i.e., the number of spiral crossings, or synch marks, at a particular radius). It should be understood, however, that the number of servo samples per revolution divided by the number of interrupts per revolution Z can be any natural number. In general, the servo sample rate (i.e., the time between adjacent and equidistant spiral crossings, or synch marks, at a particular radius) typically should be in the 15–20 kHz range to allow for a 600–700 Hz bandwidth. Thus, for a disk surface having 160 servo samples per revolution and which is spinning at a rate of 5700 revolutions per minute, the servo sample rate will be 15.2 kHz.

FIG. 10 gives two examples of calculating one of parameters X, Y or Z given that two of the parameters are known. In both examples, the number of servo samples per revolution is equal to the number of interrupts per revolution.

In Example 1, the number of interrupts per revolution Z has been selected to be 160 and interrupt rate Y has been selected to be 68 microseconds per interrupt. In such case, by using Equation 1, the spindle speed X can be determined to be 5514.705 revolutions per minute.

In Example 2, spindle speed X has been selected to be 5700 revolutions per minute and the number of interrupts per revolution Z has been selected to be 160. In such case, by using Equation 1, the interrupt rate Y can be calculated to be 65.789 microseconds per interrupt.

As will be understood by those skilled in the art, if the filter coefficients associated with the compensator of the STW servo loop are fixed based upon a particular servo sample rate, then the sample rate may be maintained by slightly adjusting the STW write speed. However, if the write speed has been chosen and is fixed, the new filter coefficients associated with the compensator of the STW servo loop may be calculated "on the fly."

As in the case of the conventional STW 50, upon receipt of an interrupt signal, the STW DSP 252 performs an interrupt service routine (ISR). However, in contrast to the conventional STW 50, special profiles are generated in order to write spiral servo patterns. Generation of special profiles (or spiral profiles) will now be discussed.

As will be understood by those skilled in the art, in order to take advantage of the position-based interrupts, a position-type profile is implemented. Since the interrupts are "tied" to the physical disk surface by the clock PLL (i.e., digital clock signal), the profile is placed precisely relative to the disk surface 12.

Preferably, spiral patterns are written onto a disk surface by moving a transducer across the disk surface at a constant velocity (e.g., 10–20 inches per second). Furthermore, guardbands (e.g., locations where information is not stored) are provided at both the inner and outer diameters of the disk surface. Thus, a spiral profile includes a "write portion," which is based upon the total radial distance that the transducer is required to move, as well as the constant velocity and guardband requirements.

FIG. 11 is a diagrammatic representation illustrating acceleration and velocity curves along a disk surface for one embodiment of a "write portion" of a spiral profile. The "write portion" of the spiral profile shown in FIG. 11 is known as a constant accelerate "bang, coast, bang" profile. In such case, accelerate/decelerate times (i.e., the "bangs") occur as the transducer 20 moves across the guardband portions (referenced by brackets in the figure) of the disk surface 12. Preferably, the accelerate/decelerate times are as small as possible. As shown in the figure, during the coast segment of the "write portion" of the spiral profile, the transducer 20 moves at a constant velocity.

The spiral profile also includes a "post-write pad portion," which allows for a settle time after the "write portion." The spiral profile yet further includes a "re-trace portion," to specify the manner by which the transducer is to return near its starting point, so that the next spiral servo pattern may be written. Preferably, the transducer returns to its starting point as quickly as possible in a manner consistent with available maximum energy and system component characteristics. Finally, the special profile includes a "post-re-trace pad portion," which allows for a settle time after the "re-trace portion" and which allows for any special processing requirements.

Figure 12:
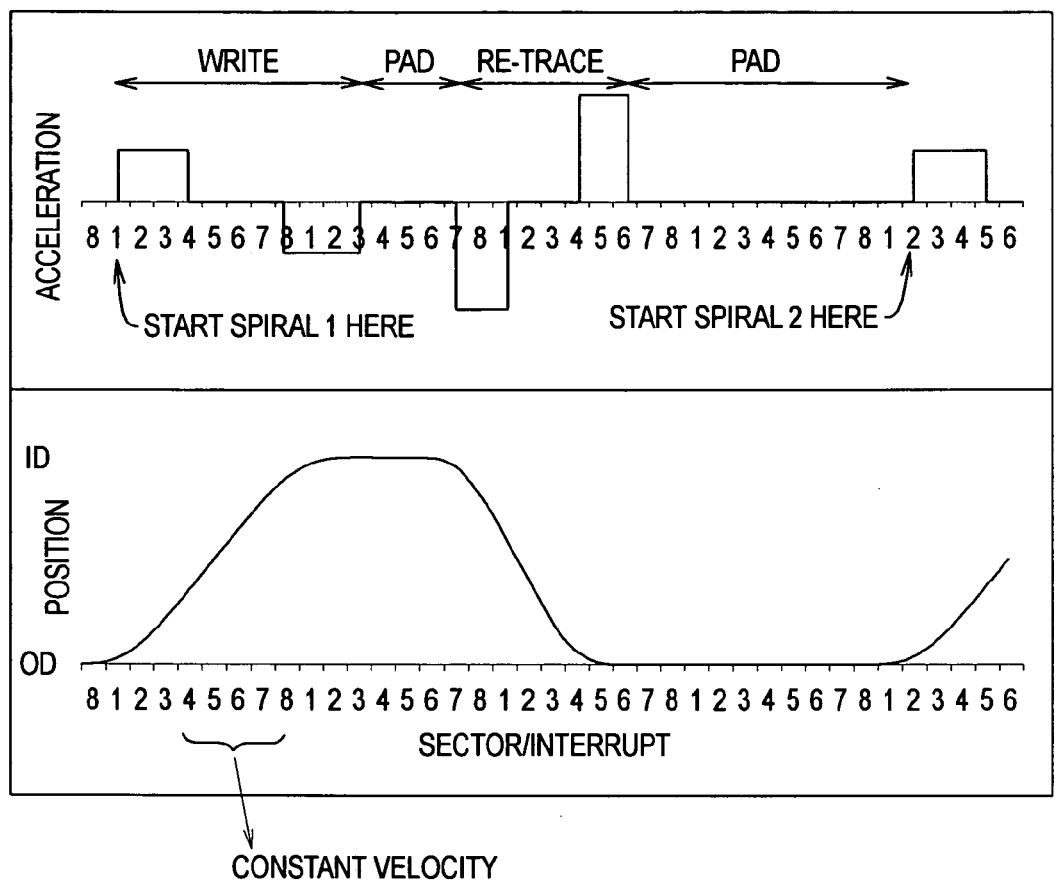
FIG. 12 is a diagrammatic representation illustrating acceleration and position curves relative to interrupts for one embodiment of a spiral profile.

FIG. 12 is a diagrammatic representation illustrating acceleration and position curves relative to interrupts for one embodiment of a spiral profile. In FIG. 12, a one-to-one relation exists between the number of interrupts and the predetermined number of servo samples. For illustrative purposes, eight spirals are to be written (i.e., there are eight servo samples per revolution and, hence, eight interrupts per revolution); however, in practice, many more spirals would be written (e.g., 160 spirals).

As shown in FIG. 12, from interrupt 1 to interrupt 4 of the first revolution, the transducer accelerates (e.g., over the guardband portion of the disk surface). Next, from interrupts 4—8 of the first revolution, the transducer moves over the disk surface at a constant velocity, so the spiral pattern is written. Subsequently, from interrupt 8 of the first revolution to interrupt 3 of the second revolution, the transducer decelerates. A pad time is provided between interrupt 3 of the second revolution to interrupt 7 of the second revolution. From interrupt 7 of the second revolution to interrupt 1 of the third revolution the transducer accelerates (in a direction opposite to the direction while writing) as part of the re-trace. From interrupt 1 to interrupt 4 of the third revolution, the transducer moves at a constant velocity. From interrupt 4 to interrupt 6 of the third revolution, the transducer decelerates (again, in a direction opposite to the direction while writing). A pad time is then provided from interrupt 6 of the third revolution for a period of 12 interrupts, so that the next spiral may be written beginning at interrupt 2 of revolution 5. This process repeats until all 8 spirals have been written.

It should be noted that, instead of generating a single spiral profile that includes a "write portion," "post-write pad portion," "re-trace portion" and "post-re-trace pad portion," one or more of the aforementioned portions may be considered to be separate profiles that are performed sequentially. However, the single profile approach is preferred. If no post spiral write processing is required, the single profile may be cycled repeatedly until all spirals are written (e.g., as in FIG. 12).

Figure 13:
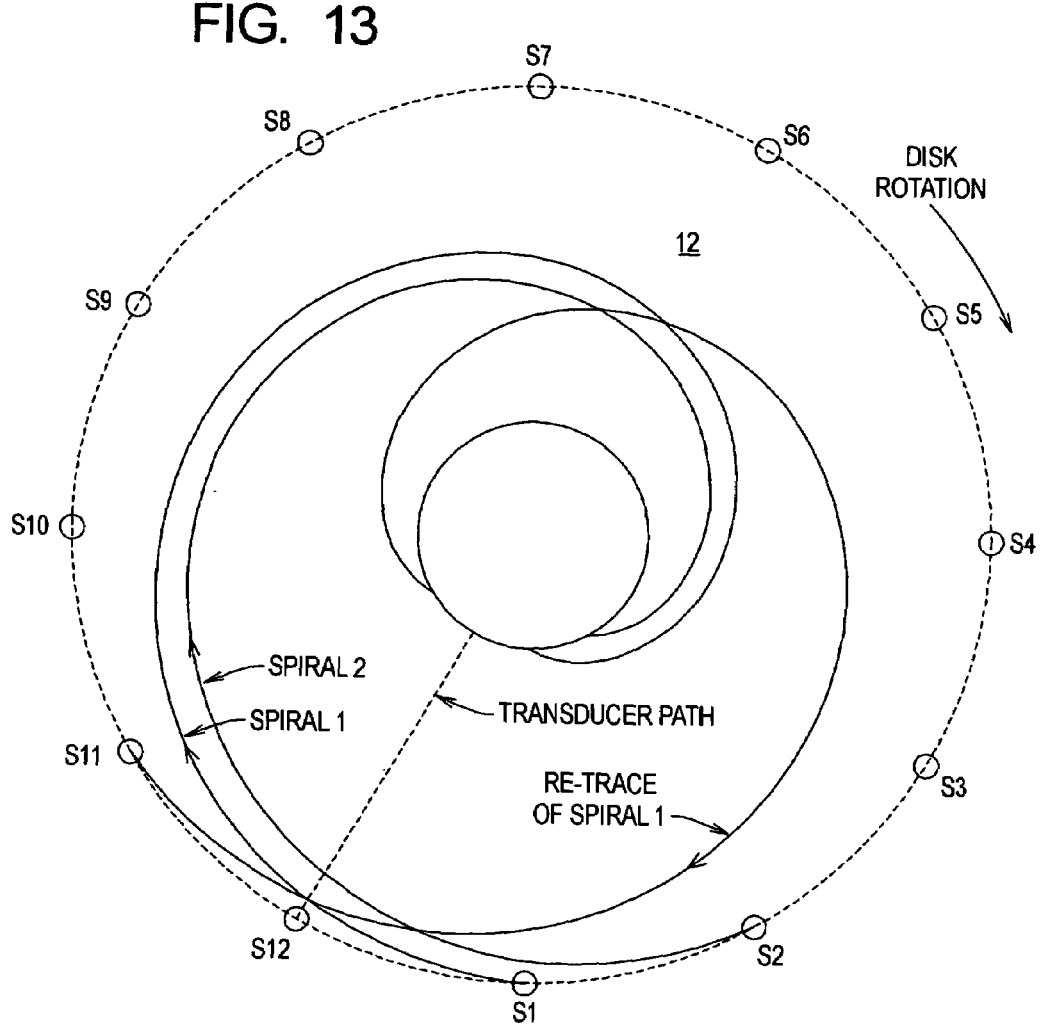
FIG. 13 is a simplified diagrammatic representation of a top view of a disk surface which illustrates a sequential manner of writing spirals of servo information on a disk surface; and, FIG. 14 is a simplified block diagram illustrating a switch, which permits a STW DSP to receive interrupts based upon a clock signal while writing spirals of servo information and to receive conventional fixed interrupts based upon a signal from a crystal during other operations.

FIG. 13 is a simplified diagrammatic representation of a top view of a disk surface which illustrates a sequential manner of writing spirals of servo information on a disk surface. For sake of clarity, in FIG. 13, twelve spirals are to be written, although many more spirals are written in practice.

In FIG. 13, by following a "write, post-write pad, re-trace, post-re-trace pad" profile (for example), a transducer begins writing spiral 1 at the predetermined position of servo sample 1 and, after a post-write pad time and re-trace, the transducer will be located at the predetermined position of servo sample 11. Presuming a one-to-one correlation exists between the number of servo sectors and the number of interrupts, spiral 2 would be written after waiting for the occurrence of three interrupts (e.g., during the post-re-trace pad). (It should be noted that, in practice, a longer duration than three interrupts may be required.) The process would repeat until all twelve of the spirals were written.

Although the spirals have been described as being written from an outer diameter to the inner diameter, it should be understood that the spirals may be written from the inner diameter to the outer diameter. Furthermore, it should be understood that a sequential manner of writing spirals is not necessary. Instead, the spirals may be written in any order and, in an extreme opposite case to the sequential manner of writing spirals, the spirals may be written in a random order.

In the case of writing spirals in a sequential manner, in one embodiment, the entire profile (e.g., "write, post-write pad, re-trace, post re-trace pad") should be equal to the predetermined total number of spiral sectors per revolution plus one. Thus, when the cycle repeats, the next spiral will begin at exactly the next predetermined servo sector location relative to the immediately previously written spiral. Accordingly, once this algorithm is started, all spirals will be written sequentially from start to finish. (It should be understood that many other algorithms are possible.)

If, for example, the entire profile doesn't equal an integer number of servo sectors per revolution plus 1, it is a relatively simple matter to wait for the appropriate physical disk location by keeping track of the number of interrupts that have occurred since the spiral writing process began.

Figure 14:
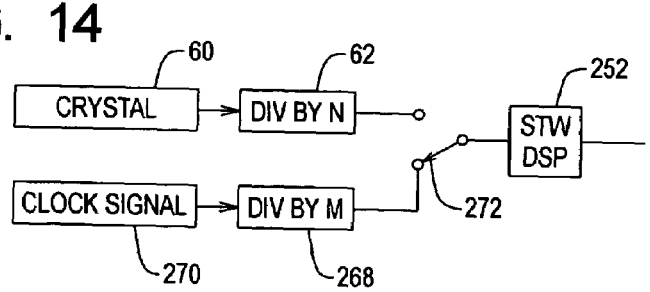

It should be understood that, after the spirals of servo information have been written, it is no longer necessary to be locked to the clock. FIG. 14 is a simplified block diagram illustrating a switch 272, which permits the STW DSP 252 to receive interrupts based upon a clock signal 270 while writing spirals of servo information and to receive conventional fixed interrupts based upon a signal from the crystal 60 during other operations.

Finally, with reference again to FIG. 9, it should be understood that the divide-by-M circuit 268 could be physically separate from the pattern generator/PLL 266.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A servo track writer comprising:
   a digital signal processor;
   a clock head which reads a clock track from a disk surface to generate a clock signal that is used to provide interrupt signals to the digital signal processor;
   a crystal which provides interrupt signals to the digital signal processor; and,
   a switch to selectively provide interrupt signals to the digital signal processor from the clock head and the crystal.

2. The servo track writer of claim 1, wherein the digital signal processor positions a transducer that writes spiral servo information onto the disk surface.

3. The servo track writer of claim 1 further including a divide-by-M circuit to generate interrupt signals at an interrupt rate that is tied to the disk surface.

4. The servo track writer of claim 3, wherein the interrupt rate is equal to a predetermined servo sample rate.

5. The servo track writer of claim 3, wherein a predetermined servo sample rate divided by the interrupt rate equals a natural number.

6. The servo track writer of claim 1 further including a clock head amplifier which amplifies the clock signal.

7. The servo track writer of claim 6 further including a phase-locked loop which receives the amplified clock signal and generates a digital clock signal.

8. The servo track writer of claim 7 further including a divide-by-M circuit to divide down the digital clock signal, wherein the digital clock signal is provided to the digital signal processor.

9. The servo track writer of claim 1, wherein a predetermined number of servo sectors per revolution are designed to be placed on the disk surface, wherein a predetermined number of interrupt signals are provided to the digital signal processor per revolution of the disk surface, and wherein the predetermined number of servo sectors per revolution divided by the predetermined number of interrupt signals provided to the digital signal processor per revolution equals a natural number.

10. A method of writing servo information in spiral patterns onto a disk surface using a servo track writer having a digital signal processor comprising the steps of:
    reading a clock track written onto the disk surface to generate interrupt signals;
    providing the interrupt signals to the digital signal processor;
    generating a spiral profile based upon a predetermined interrupt rate, wherein the profile includes a write portion, a post-write pad portion, a re-trace portion and a post-re-trace pad portion;
    positioning a transducer over the disk surface using the servo track writer in a closed-loop manner, so that the transducer follows the spiral profile; and,
    writing the spiral patterns in a random order about the disk surface.

11. The method of claim 10 including the step of:
    positioning the transducer over the disk surface under control of the digital signal processor.

12. The method of claim 11, wherein the transducer is positioned based upon the interrupt signals provided to the digital signal processor.

13. The method of claim 10 including the step of:
    writing one of the spiral patterns onto the disk surface by following the spiral profile.

14. The method of claim 10 including the step of:
    writing the spiral patterns onto the disk surface by following a series of spiral profiles.

15. The method of claim 10, wherein the spiral patterns include synch marks and wherein synch marks along a particular radius are equally spaced.

16. The method of claim 10, wherein the spiral patterns include synch marks and wherein corresponding synch marks along different spirals are located on common radiuses.

17. A servo track writer comprising:
    a digital signal processor;
    a clock head which reads a clock track from a disk surface to generate an analog clock signal;
    a clock head amplifier for amplifying the analog clock signal to generate an amplified clock signal;
    circuitry for converting the amplified clock signal to a digital clock signal which is delivered to the digital signal processor to provide interrupt signals thereto;
    a crystal which provides interrupt signals to the digital signal processor; and,
    a switch to selectively provide interrupt signals to the digital signal processor from the clock head and the crystal.

18. The servo track writer of claim 17 further including circuitry to divide down the digital clock signal before it is delivered to the digital signal processor.

19. The servo track writer of claim 17, wherein the digital signal processor positions a transducer that writes spiral servo information onto the disk surface based upon the interrupt signals delivered thereto.

20. A method of writing servo information in spiral patterns onto a disk surface using a servo track writer having a digital signal processor comprising the steps of:
reading a clock track written onto the disk surface to generate interrupt signals;
providing the interrupt signals to the digital signal processor; and,
writing the spiral patterns in a random order about the disk surface.

21. The method of claim 20 including the step of:
positioning the transducer over the disk surface under control of the digital signal processor.

22. The method of claim 21, wherein the transducer is positioned based upon the interrupt signals provided to the digital signal processor.

23. The method of claim 20 including the step of:
writing one of the spiral patterns onto the disk surface by following the spiral profile.

24. The method of claim 20 including the step of:
writing the spiral patterns onto the disk surface by following a series of spiral profiles.

25. The method of claim 20, wherein the spiral patterns include synch marks and wherein synch marks along a particular radius are equally spaced.

26. The method of claim 20, wherein the spiral patterns include synch marks and wherein corresponding synch marks along different spirals are located on common radiuses.

27. A method of writing servo information onto a disk surface using a servo track writer having a digital signal processor comprising the steps of:
reading a clock track written onto the disk surface using a clock head to generate interrupt signals;
providing a crystal for generating interrupt signals; and,
selectively providing interrupt signals to the digital signal processor from the clock head and the crystal.

28. The method of claim 27 further including the steps of:
positioning a transducer using the digital signal processor; and,
writing spiral servo information onto the disk surface using the transducer.

29. The method of claim 27 further including the step of:
generating interrupt signals at an interrupt rate that is tied to the disk surface.

30. The method of claim 29, wherein the interrupt signals are generated using a divide-by-M circuit.

31. The method claim 29, wherein the interrupt rate is equal to a predetermined servo sample rate.

32. The method of claim 29, wherein a predetermined servo sample rate divided by the interrupt rate equals a natural number.

33. The method of claim 27, wherein a predetermined number of servo sectors per revolution are designed to be placed on the disk surface, wherein a predetermined number of interrupt signals are provided to the digital signal processor per revolution of the disk surface, and wherein the predetermined number of servo sectors per revolution divided by the predetermined number of interrupt signals provided to the digital signal processor per revolution equals a natural number.

34. The method of claim 27, wherein the servo information includes spiral patterns and wherein the spiral patterns are written sequentially about the disk surface.

35. A method of writing servo information in spiral patterns onto a disk surface using a servo track writer having a digital signal processor comprising the steps of:
reading a clock track written onto the disk surface to generate interrupt signals;
providing the interrupt signals to the digital signal processor;
generating a spiral profile based upon a predetermined interrupt rate;
positioning a transducer associated with the disk surface using the servo track writer in a closed-loop manner, so that the transducer follows the spiral profile; and
writing the spiral patterns in a random order about the disk surface.

36. A method of writing servo information in spiral patterns onto a disk surface using a servo track writer that has a digital signal processor and an actuator arm, said method comprising the steps of:
reading a clock track written onto the disk surface to generate interrupt signals;
providing the interrupt signals to the digital signal processor;
generating a spiral profile based upon a predetermined interrupt rate, wherein the profile includes a write portion, a post-write pad portion, a re-trace portion and a post-re-trace pad portion; and
writing the spiral patterns in a random order about the disk surface.

37. A method of writing servo information in spiral patterns onto a disk surface using a servo track writer having a digital signal processor comprising the steps of:
reading a clock track written onto the disk surface to generate interrupt signals;
providing the interrupt signals to the digital signal processor;
generating a spiral profile based upon a predetermined interrupt rate, wherein the profile includes a write portion, a post-write pad portion, a re-trace portion and a post-re-trace pad portion;
positioning a transducer over the disk surface using the servo track writer in a closed-loop manner; and
writing the spiral patterns in a random order about the disk surface.

38. A method of writing servo information in spiral patterns onto a disk surface using a servo track writer having a digital signal processor comprising the steps of:
reading a clock track written onto the disk surface to generate interrupt signals;
providing the interrupt signals to the digital signal processor;
generating a spiral profile based upon a predetermined interrupt rate, wherein the profile includes a write portion, a post-write pad portion, a re-trace portion and a post-re-trace pad portion,
wherein the spiral patterns are written in a random order about the disk surface.

39. A servo track writer that writes servo information onto a disk surface comprising:
a digital signal processor;
a clock head which reads a clock track from the disk surface to generate a clock signal that is used to provide interrupt signals to the digital signal processor;
a crystal which provides interrupt signals to the digital signal processor; and, a switch to selectively provide interrupt signals to the digital signal processor from the clock head and the crystal.

40. The servo track writer of claim 39, wherein the digital signal processor positions a transducer that writes spiral servo information onto the disk surface.

41. The servo track writer of claim 39 further including a divide-by-M circuit to generate interrupt signals at an interrupt rate that is tied to the disk surface.

42. The servo track writer of claim 41, wherein the interrupt rate is equal to a predetermined servo sample rate.

43. The servo track writer of claim 41, wherein a predetermined servo sample rate divided by the interrupt rate equals a natural number.

44. The servo track writer of claim 39 further including a clock head amplifier which amplifies the clock signal.

45. The servo track writer of claim 44 further including a phase-locked loop which receives the amplified clock signal and generates a digital clock signal.

46. The servo track writer of claim 45 further including a divide-by-M circuit to divide down the digital clock signal, wherein the digital clock signal is provided to the digital signal processor.

47. The servo track writer of claim 39, wherein a predetermined number of servo sectors per revolution are designed to be placed on the disk surface, wherein a predetermined number of interrupt signals are provided to the digital signal processor per revolution of the disk surface, and wherein the predetermined number of servo sectors per revolution divided by the predetermined number of interrupt signals provided to the digital signal processor per revolution equals a natural number.

* * * * *